US012659598B2

(12) United States Patent
Tajima

(10) Patent No.: US 12,659,598 B2
(45) Date of Patent: Jun. 16, 2026

(54) IMAGE PROCESSING APPARATUS AND CONTROL METHOD THEREOF, IMAGE CAPTURING APPARATUS, AND STORAGE MEDIUM WITH MIXED HIGH DYNAMIC RANGE/STANDARD DYNAMIC RANGE DISPLAY USING LIGHT-EMISSION-CHARACTERISTIC OPTO-ELECTRIC TRANSFER FUNCTION

(71) Applicant: CANON KABUSHIKI KAISHA, Tokyo (JP)

(72) Inventor: Hiroshi Tajima, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 156 days.

(21) Appl. No.: 18/650,254

(22) Filed: Apr. 30, 2024

(65) Prior Publication Data

US 2024/0388807 A1 Nov. 21, 2024

(30) Foreign Application Priority Data

May 15, 2023 (JP) ................................. 2023-080363

(51) Int. Cl.
*H04N 23/741* (2023.01)
*G06F 3/14* (2006.01)
*H04N 23/63* (2023.01)

(52) U.S. Cl.
CPC ............. *H04N 23/741* (2023.01); *G06F 3/14* (2013.01); *H04N 23/633* (2023.01)

(58) Field of Classification Search
CPC ...................................................... H04N 23/74
See application file for complete search history.

(56) References Cited

U.S. PATENT DOCUMENTS

| | | | | |
|---|---|---|---|---|
| 2017/0105042 A1* | 4/2017 | Toma | ................. | G11B 27/3027 |
| 2019/0191124 A1* | 6/2019 | Peng | .......................... | G06T 5/90 |
| 2021/0407400 A1* | 12/2021 | Onuma | ................ | G09G 3/2003 |
| 2022/0199054 A1* | 6/2022 | Suzuki | ...................... | G06T 5/92 |
| 2024/0013356 A1* | 1/2024 | Chen | .......................... | G06T 5/50 |

FOREIGN PATENT DOCUMENTS

| | | |
|---|---|---|
| JP | 2020136737 A | 8/2020 |
| JP | 2021034971 A | 3/2021 |

\* cited by examiner

*Primary Examiner* — Cynthia Calderon
(74) *Attorney, Agent, or Firm* — Venable LLP

(57) ABSTRACT

An image processing apparatus including at least one processor or circuit configured to function as a first conversion unit configured to perform at least one of a first conversion that includes converting an Opto-Electro Transfer Function (OETF) of a High Dynamic Range image (HDR image) to an OETF based on light emission characteristics of a display device, or a second conversion that includes converting an OETF of a Standard Dynamic Range image (SDR image) to the OETF of light emission characteristics of the display device, a transmission unit configured to transmit the HDR image converted by the first conversion and the SDR image converted by the second conversion to the display device, and a synthesis unit configured to synthesize the HDR image and the SDR image before performing the conversion by the first conversion and the second conversion.

13 Claims, 16 Drawing Sheets

F I G. 1
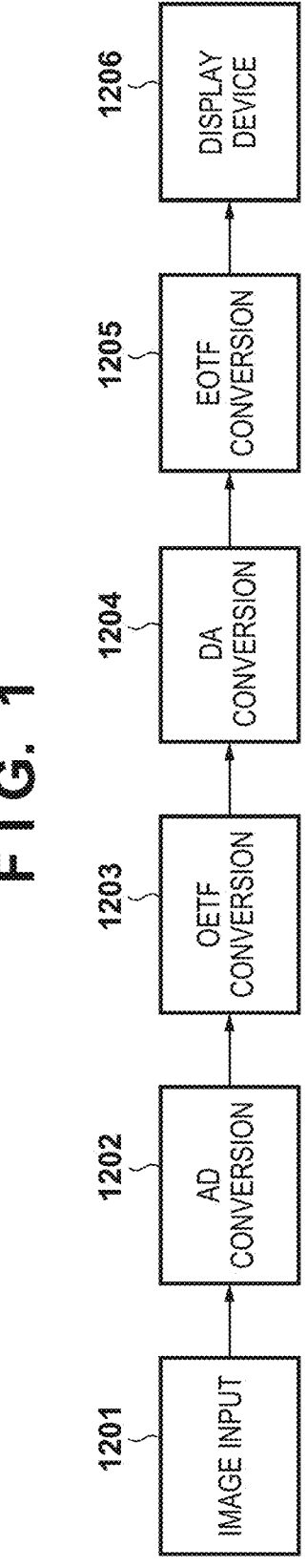

BT.709 EOTF
ST.2084 EOTF
OLED LIGHT EMISSION CHARACTERISTICS

RATIO TO MAXIMUM LUMINANCE

CODE VALUE

F I G. 3
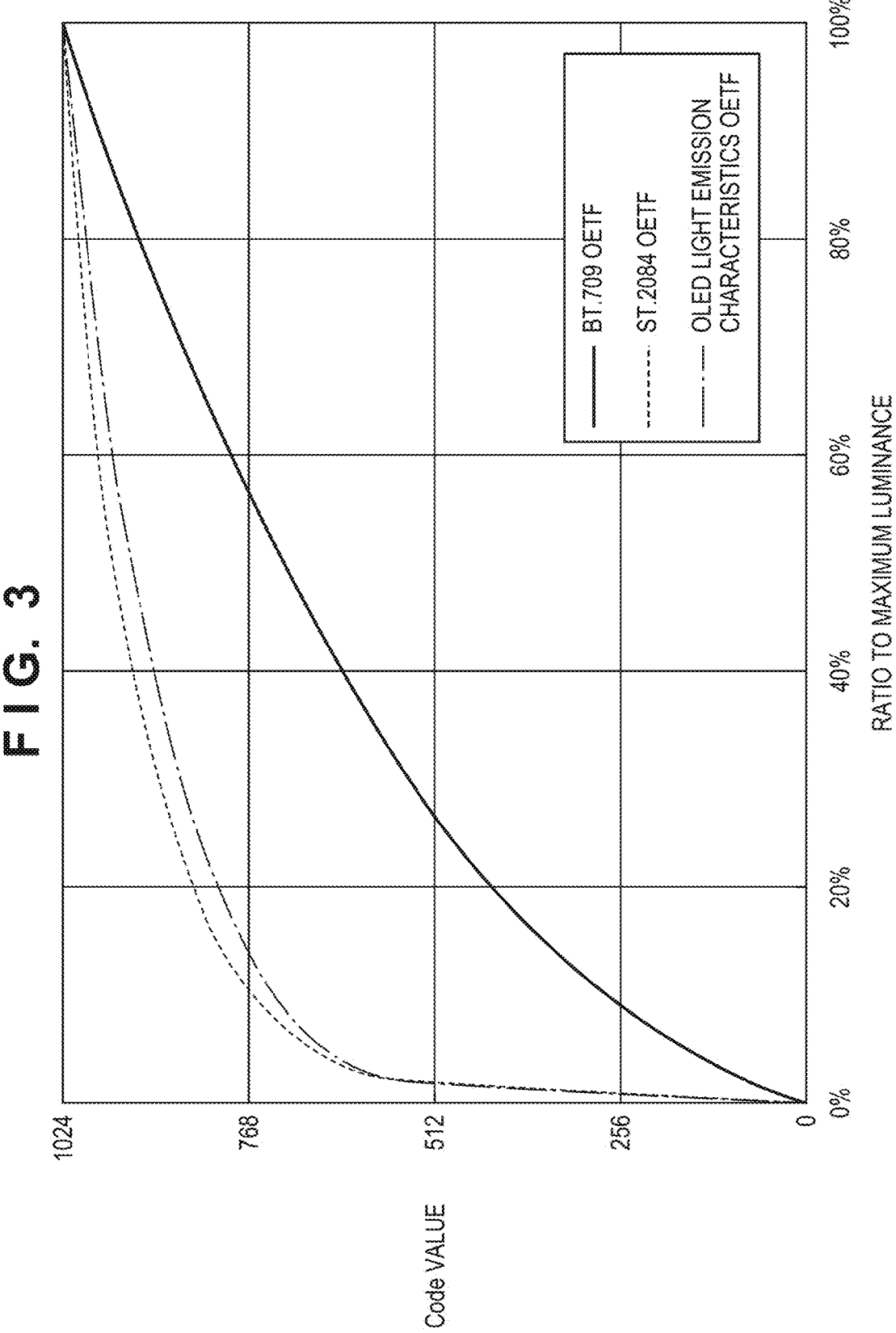

F I G. 4

| RATIO (%) | BT.709 | ST 2084 | LIGHT EMISSION CHARACTERISTICS |
|---|---|---|---|
| 0 | 0 | 0 | 0 |
| 1 | 11 | 130 | 138 |
| 5 | 48 | 173 | 168 |
| 10 | 74 | 192 | 184 |
| 15 | 94 | 203 | 194 |
| 20 | 111 | 211 | 202 |
| 25 | 125 | 217 | 209 |
| 30 | 138 | 222 | 214 |
| 35 | 149 | 226 | 219 |
| 40 | 160 | 230 | 223 |
| 45 | 170 | 233 | 227 |
| 50 | 180 | 236 | 230 |
| 55 | 189 | 239 | 234 |
| 60 | 197 | 241 | 237 |
| 65 | 206 | 243 | 239 |
| 70 | 213 | 245 | 242 |
| 75 | 221 | 247 | 244 |
| 80 | 228 | 249 | 247 |
| 85 | 235 | 251 | 249 |
| 90 | 242 | 252 | 251 |
| 95 | 249 | 254 | 253 |
| 100 | 255 | 255 | 255 |

F I G. 6A
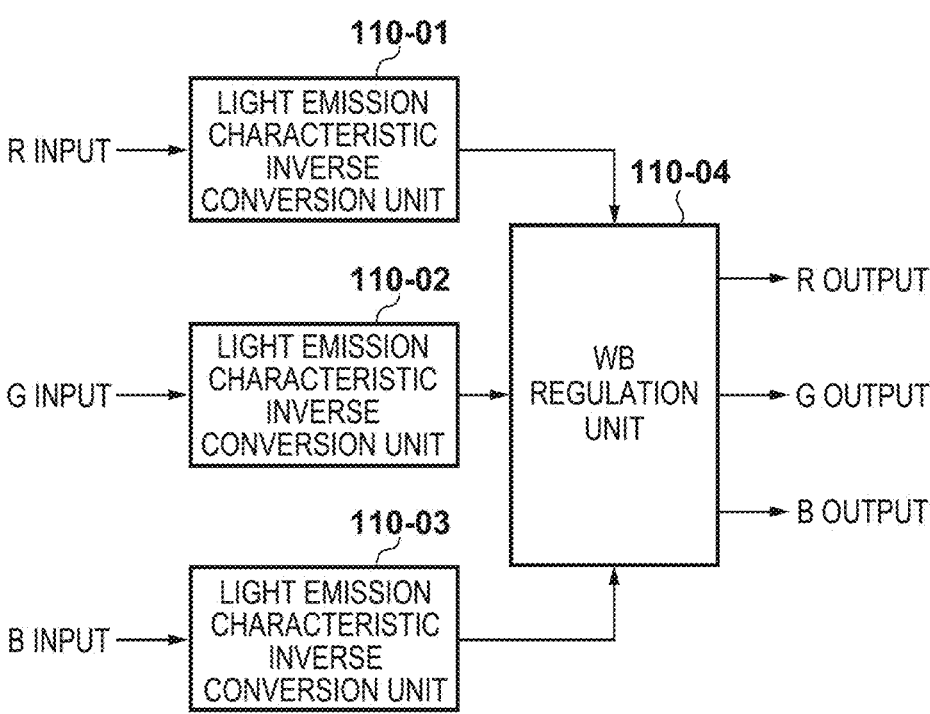
F I G. 6B
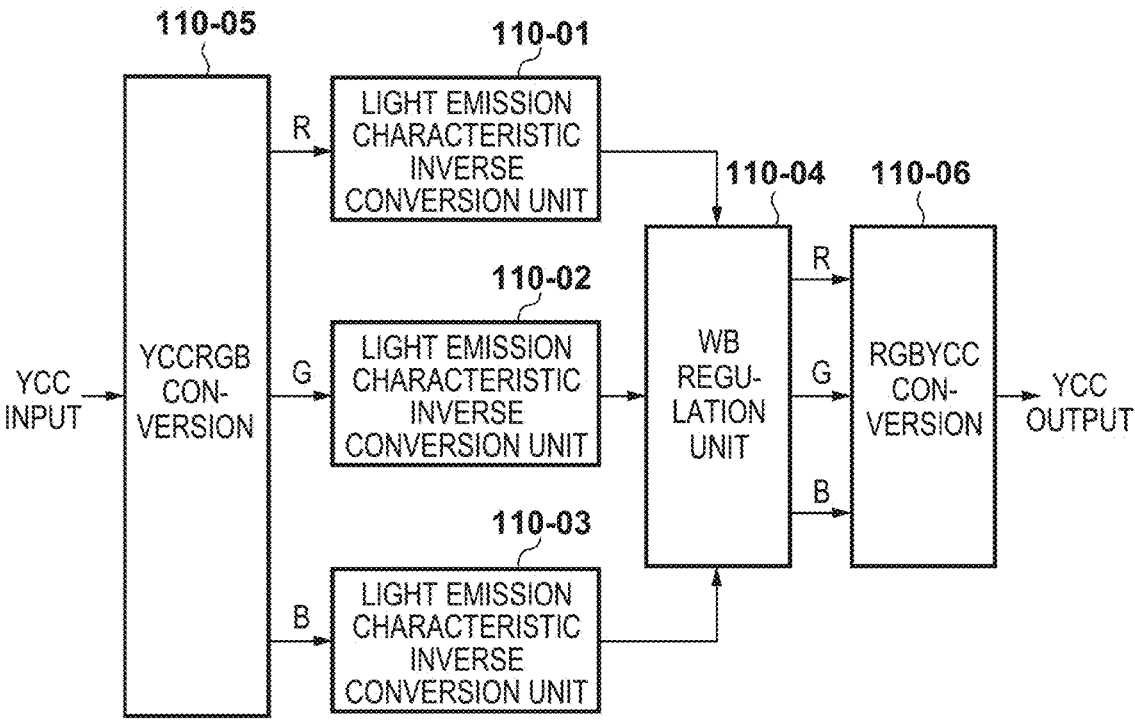

F I G. 7
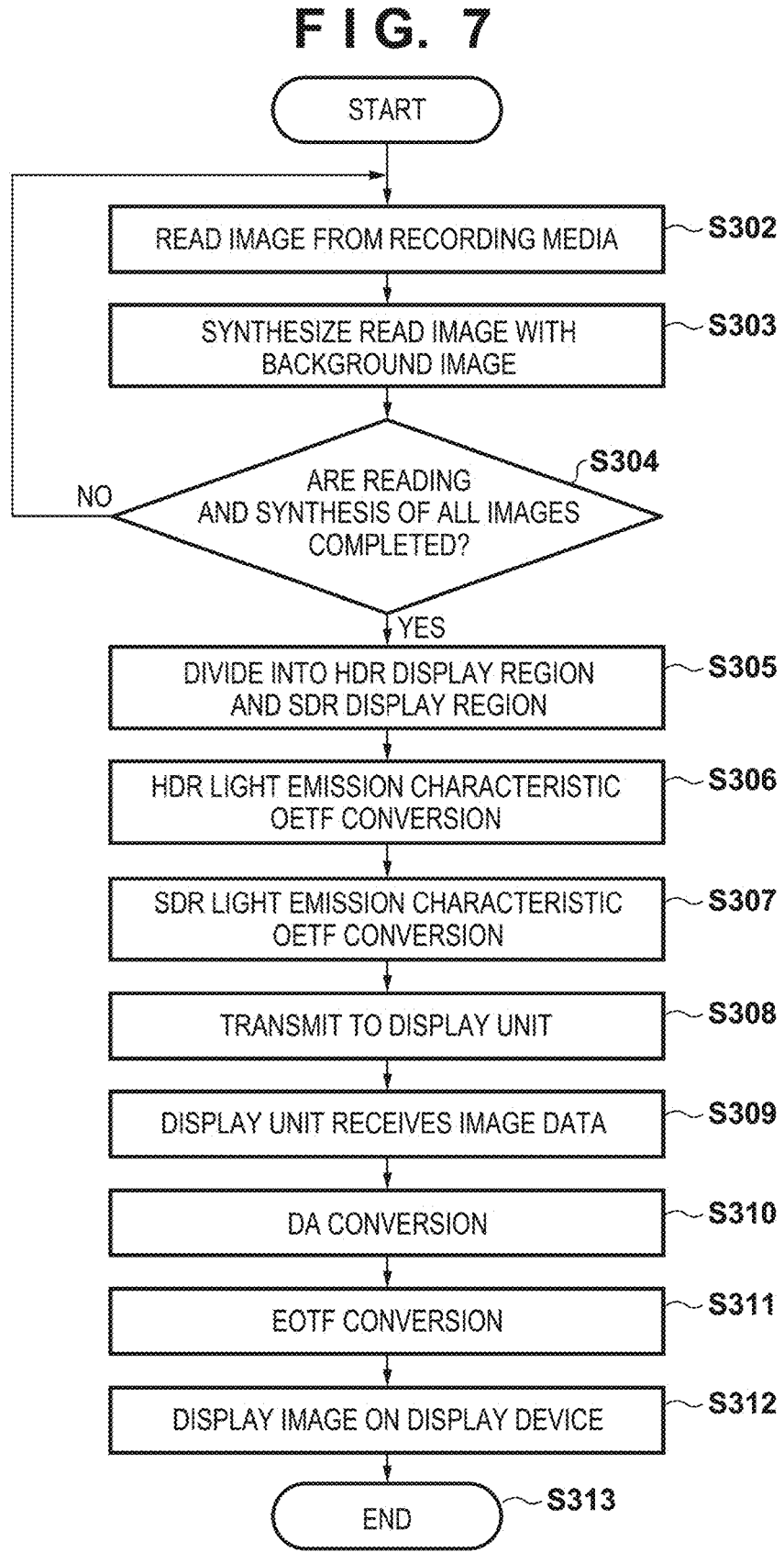

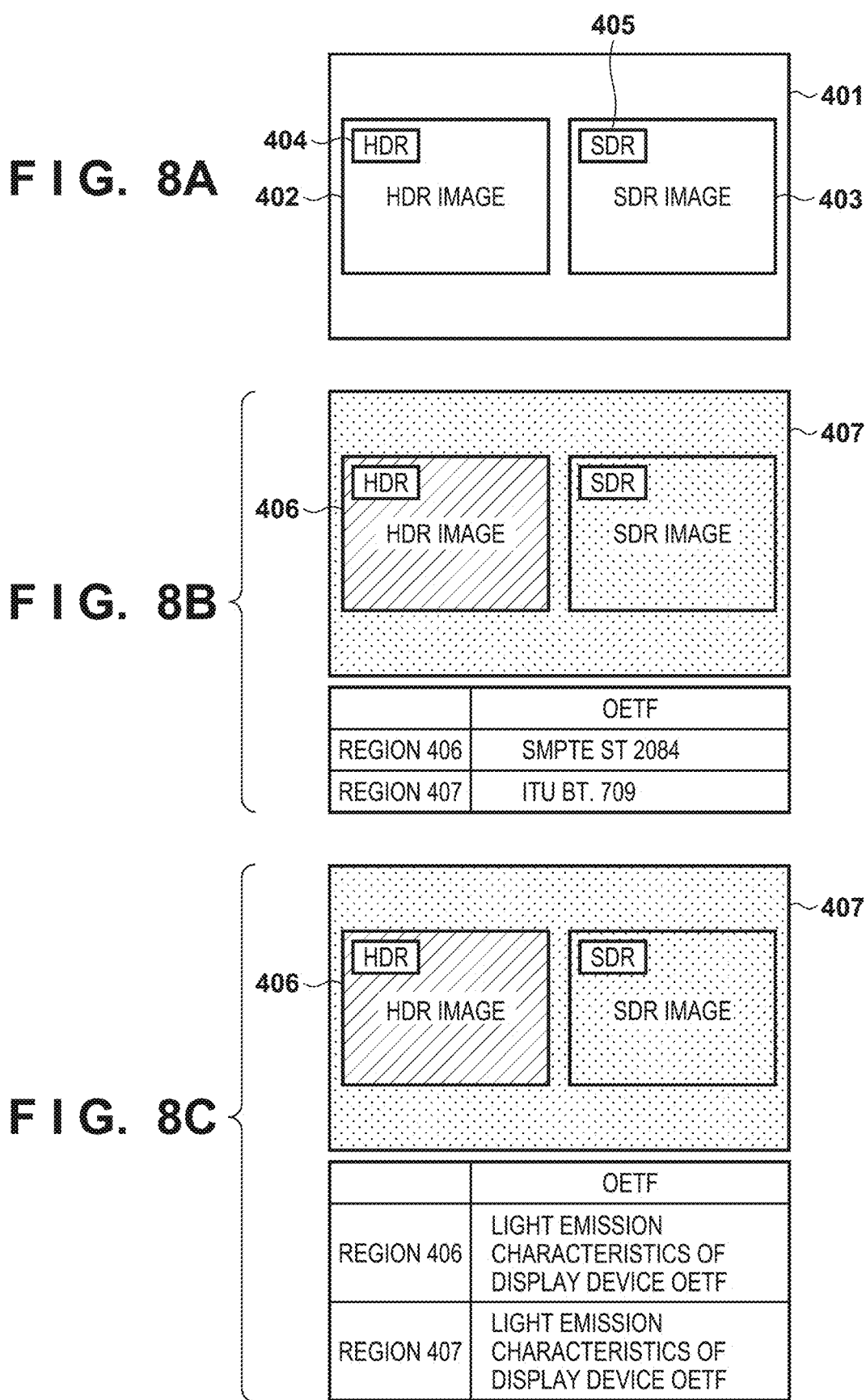
F I G. 8A
F I G. 8B
F I G. 8C

F I G. 9
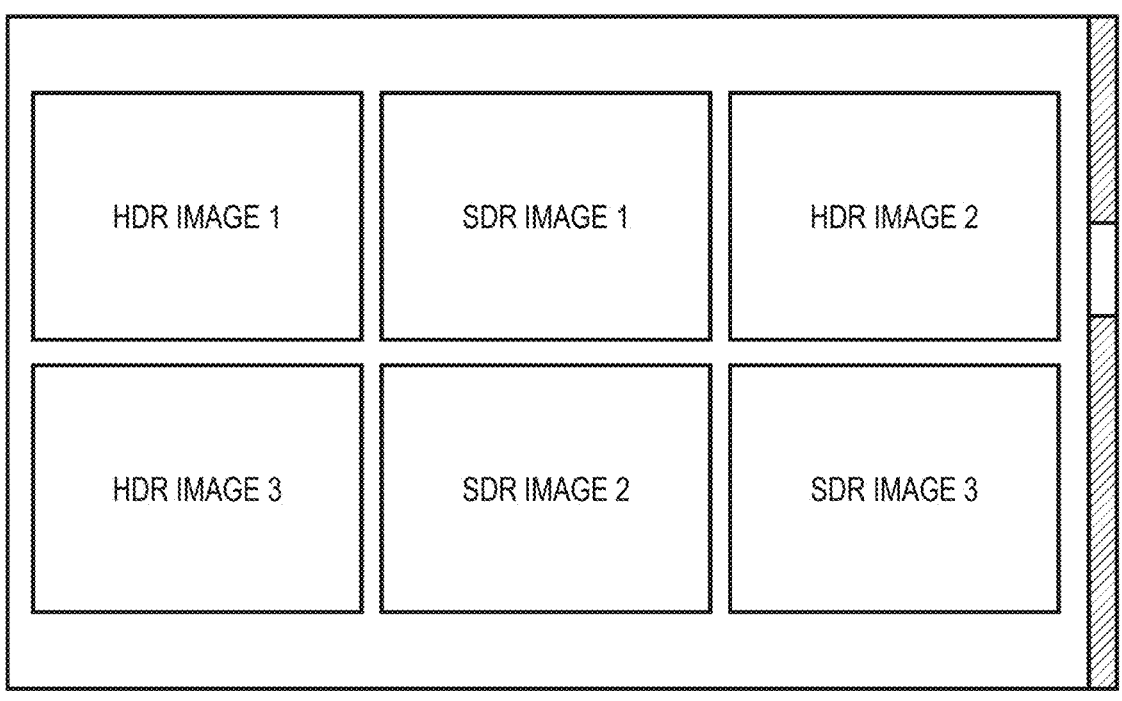

F I G. 11
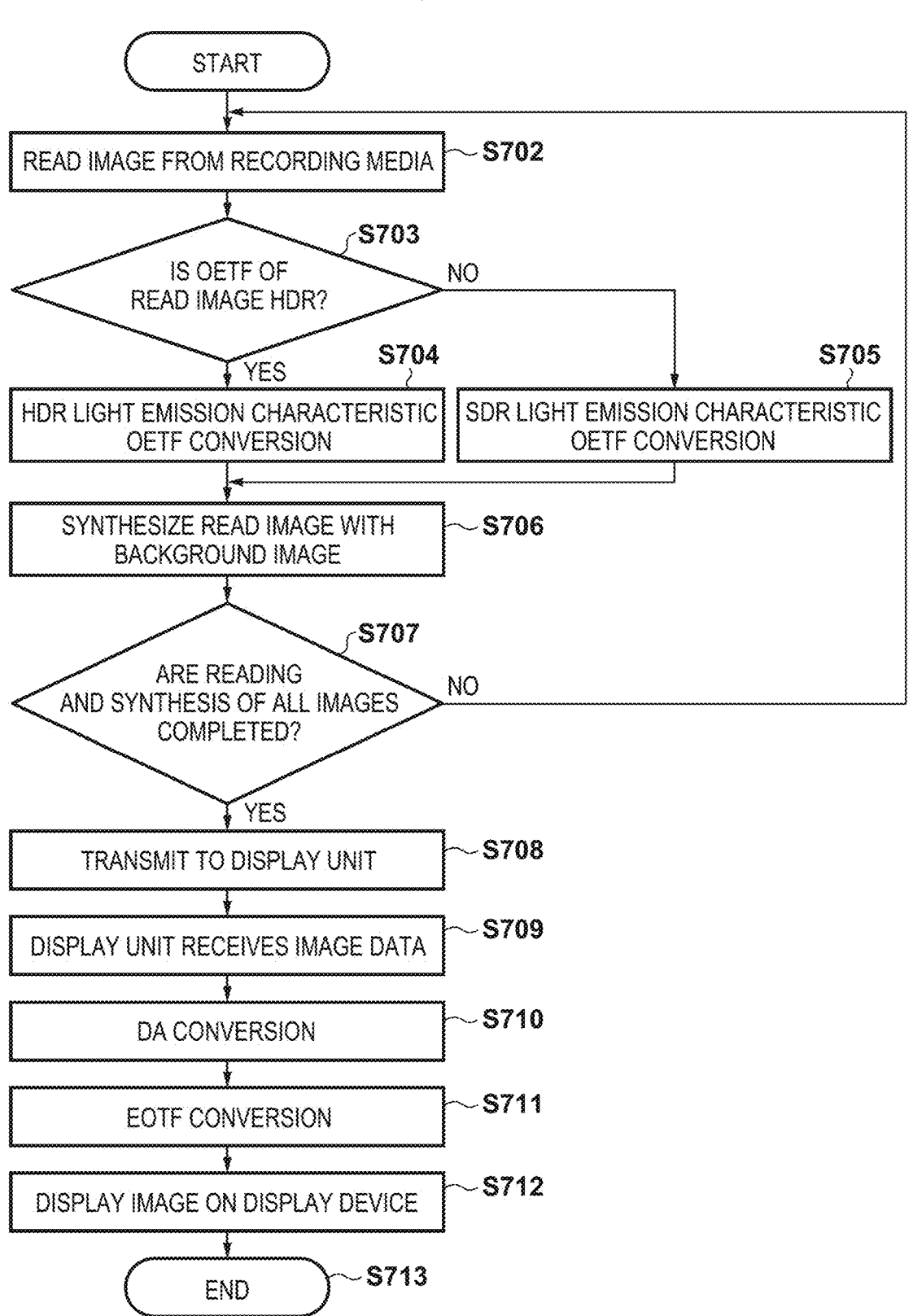

F I G.  14
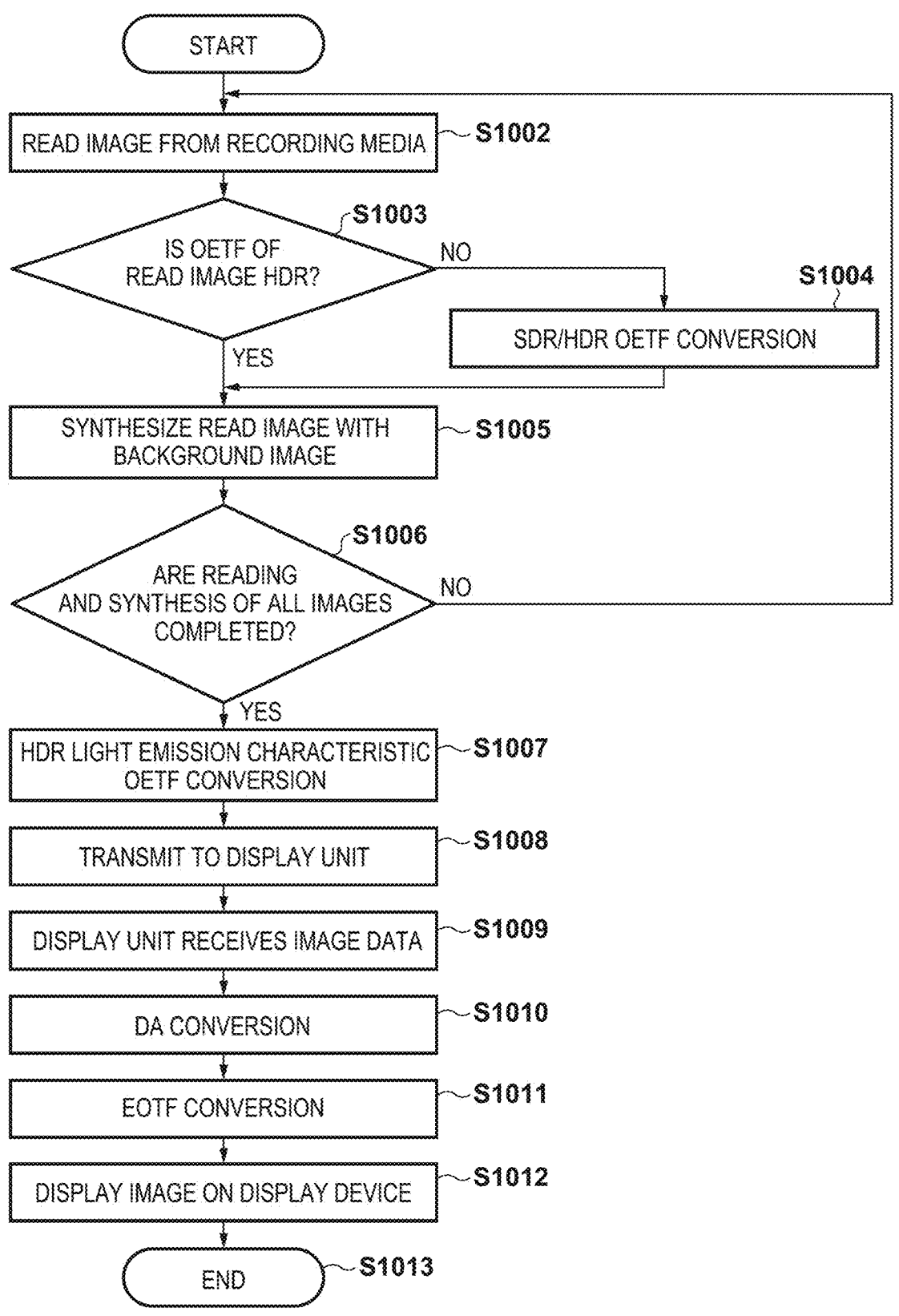

F I G.  15A
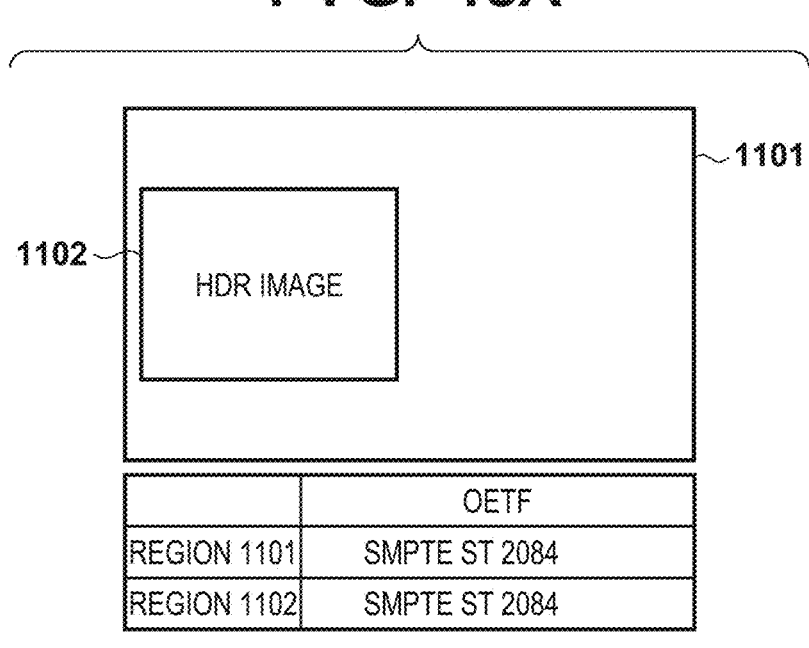
F I G.  15B
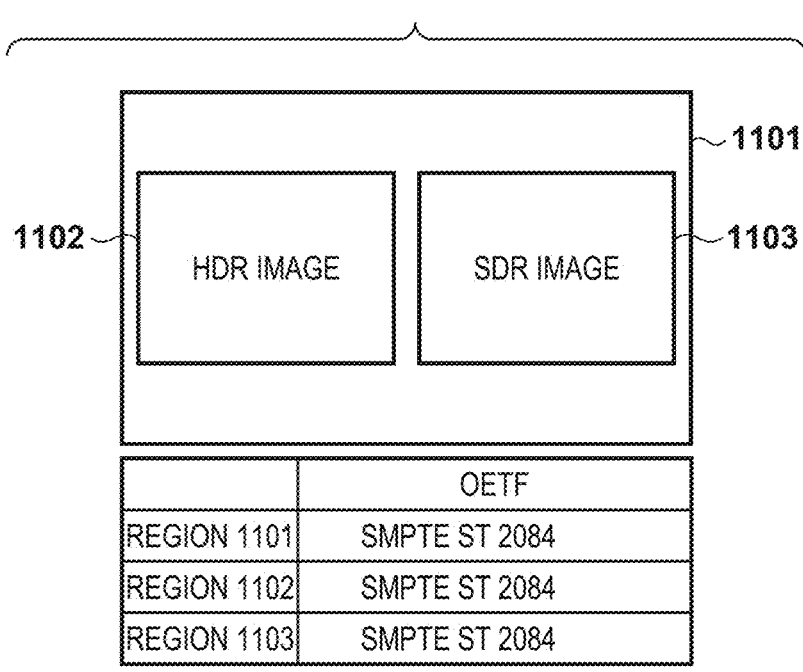

F I G.  15C

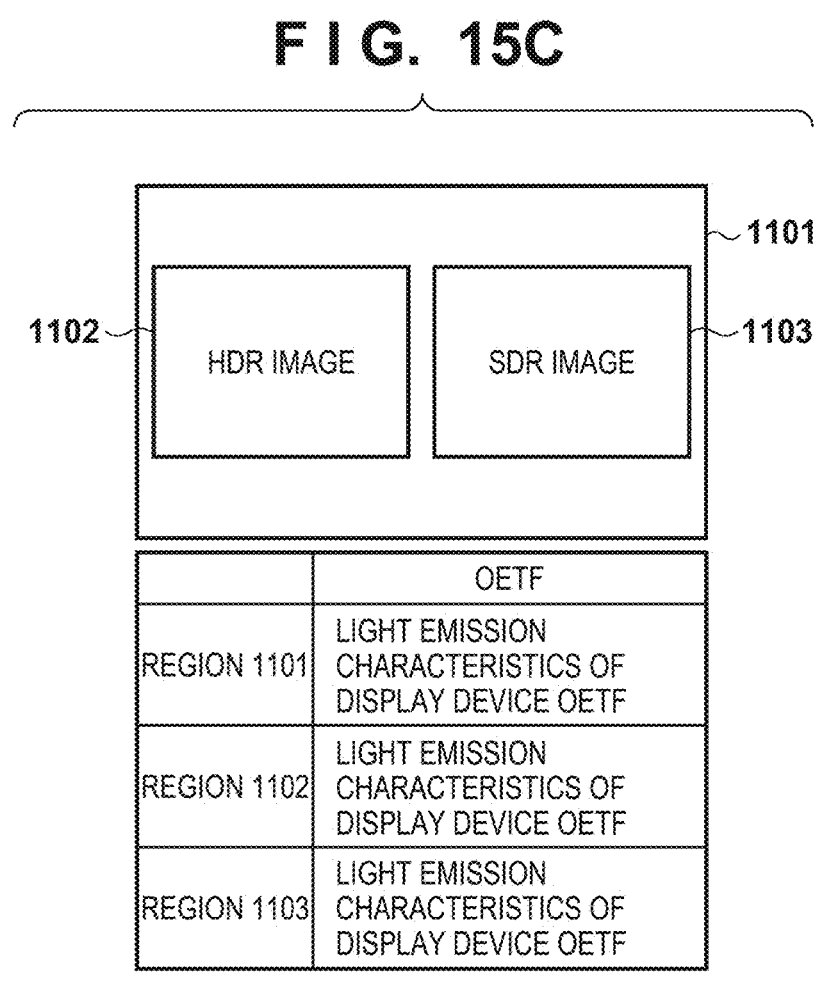

| | OETF |
|---|---|
| REGION 1101 | LIGHT EMISSION CHARACTERISTICS OF DISPLAY DEVICE OETF |
| REGION 1102 | LIGHT EMISSION CHARACTERISTICS OF DISPLAY DEVICE OETF |
| REGION 1103 | LIGHT EMISSION CHARACTERISTICS OF DISPLAY DEVICE OETF |

HDR IMAGE     SDR IMAGE 1101
1102
1103

IMAGE PROCESSING APPARATUS AND CONTROL METHOD THEREOF, IMAGE CAPTURING APPARATUS, AND STORAGE MEDIUM WITH MIXED HIGH DYNAMIC RANGE/STANDARD DYNAMIC RANGE DISPLAY USING LIGHT-EMISSION-CHARACTERISTIC OPTO-ELECTRIC TRANSFER FUNCTION

CROSS-REFERENCE TO PRIORITY APPLICATION

This application claims the benefit of Japanese Patent Application No. 2023-080363, filed May 15, 2023, which is hereby incorporated by reference herein in its entirety.

BACKGROUND OF THE INVENTION

Field of the Invention

The present invention relates to an image processing apparatus configured to generate and to transmit image data.

Description of the Related Art

In recent years, the type of single-lens digital cameras is shifting from single-lens reflex type to mirrorless type. Accordingly, the eyepiece finder is shifting from an Optical View Finder (referred to as OVF in the following) to an Electronic View Finder (referred to as EVF in the following).

In a case of the OVF, the light entering through a lens is directly viewed, whereas in a case of the EVF, an image processed by an image processing engine and displayed on a display unit of the EVF is viewed, and thus a difference may occur in the appearance of the subject between the OVF and the EVF.

In recent years, there is an increasing demand for image content having a wide dynamic range referred to as High Dynamic Range (HDR). On the other hand, image content before HDR is referred to as Standard Dynamic Range (SDR).

HDR is defined in an international standard referred as SMPTE STANDARD 2084 (referred to as SMPTE ST 2084 in the following) that image data of 10-bit or more for display is required for HDR. On the other hand, SDR is defined in an international standard referred as RECOMMENDATION ITU-R BT. 709 (referred to as ITU BT. 709 in the following) that image data of eight bits or more for display is required for SDR.

Here, it may be desired to display a plurality of HDR and SDR images in a mixed manner on the display unit. Japanese Patent Laid-Open No. 2020-136737 discloses a technique for converting a dynamic range of an image to be output in accordance with a dynamic range that can be displayed on an output destination, when a plurality of images of different dynamic ranges are displayed side by side on a display unit.

When the display apparatus is a large-scale device such as a commercial monitor, it is easy to secure a bit precision of 10-bit or more for the calculation circuit, because there are fewer constraints in terms of hardware such as power consumption or heat generation. Therefore, it is possible to perform HDR display compliant with SMPTE ST 2084.

On the other hand, it is difficult to construct a circuit having calculation precision of 10-bit or more with a small-scale device such as the EVF due to problems such as power consumption or heat generation. In addition, for assignment of an input interface for data, an image data resolution and a frame rate are used on a priority basis, and thus the input interface for data is less than 10-bit. In such a case, a quantization error may occur in calculation, and thus it is difficult to maintain the gradation of an HDR image mainly in low luminance regions.

In addition, the EVF includes an input interface configured to receive an input of a single signal such as Mobile Industry Processor Interface (MIPI (trade name)), or Sub-Low Voltage Differential Signal (Sub-LVDS). Therefore, it is currently difficult to transmit and to display an HDR image, for which degradation of image quality is suppressed, and an SDR image simultaneously via a single port.

SUMMARY OF THE INVENTION

The present invention, which has been made in view of the aforementioned problems, provides a technique for simultaneously transmitting an HDR image, for which degradation of image quality is suppressed, and an SDR image via a single port, allowing display of an HDR image and an SDR image in a mixed manner.

According to a first aspect of the present invention, an image processing apparatus comprises at least one processor or circuit configured to function as a first conversion unit configured to perform at least one of a first conversion that includes converting an Opto-Electro Transfer Function (OETF) of a High Dynamic Range image (HDR image) to an OETF based on light emission characteristics of a display device, or a second conversion that includes converting an OETF of a Standard Dynamic Range image (SDR image) to the OETF of light emission characteristics of the display device, and a transmission unit configured to transmit the HDR image converted by the first conversion and the SDR image converted by the second conversion to the display device.

According to a second aspect of the present invention, an image capturing apparatus comprises an image capturing device and an image processing apparatus including at least one processor or circuit configured to function as a first conversion unit configured to perform at least one of a first conversion that includes converting an Opto-Electro Transfer Function (OETF) of a High Dynamic Range image (HDR image) to an OETF based on light emission characteristics of a display device, or a second conversion that includes converting an OETF of a Standard Dynamic Range image (SDR image) to the OETF of light emission characteristics of the display device, and a transmission unit configured to transmit the HDR image converted by the first conversion and the SDR image converted by the second conversion to the display device.

According to a third aspect of the present invention, a method of controlling an image processing apparatus comprises performing a first conversion that includes performing at least one of a first conversion that includes converting an Opto-Electro Transfer Function (OETF) of a High Dynamic Range image (HDR image) to an OETF based on light emission characteristics of a display device, or a second conversion that includes converting an OETF of a Standard Dynamic Range image (SDR image) image to the OETF of light emission characteristics of the display device and transmitting the HDR image converted by the first conversion and the SDR image converted by the second conversion to the display device.

Further features of the present invention will become apparent from the following description of exemplary embodiments with reference to the attached drawings.

BRIEF DESCRIPTION OF THE DRAWINGS

FIG. 1 is a block diagram of a general image capturing apparatus.

FIG. 3 is a diagram illustrating a graph of OETF.

FIG. 4 is a diagram illustrating assignment of code values of OETF.

FIG. 6A and FIG. 6B are block diagrams of a light emission characteristics inverse conversion unit.

FIG. 7 is a flowchart illustrating image processing in the first embodiment.

FIG. 8A to FIG. 8C are diagrams illustrating image processing results according to the first embodiment.

FIG. 9 is a diagram illustrating a thumbnail display in which HDR images and SDR images are mixed.

FIG. 11 is a flowchart of image processing according to the second embodiment.

FIG. 14 is a flowchart of image processing according to the third embodiment.

FIG. 15A to FIG. 15C are diagrams illustrating image processing results according to the third embodiment.

DESCRIPTION OF THE EMBODIMENTS

Figure 2:
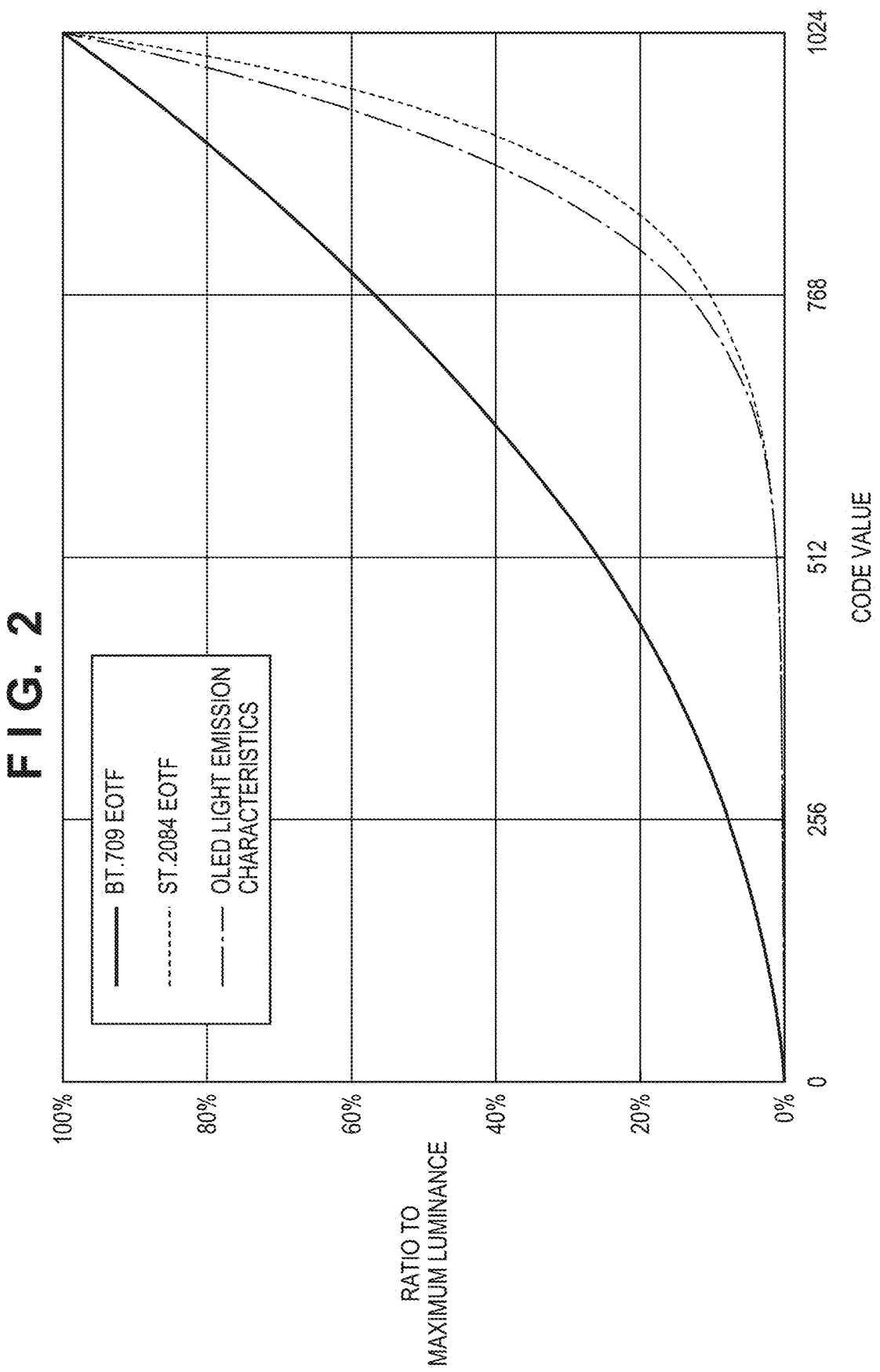
FIG. 2 is a diagram illustrating a graph of EOTF.

Hereafter, embodiments will be described in detail with reference to the attached drawings. Note, the following embodiments are not intended to limit the scope of the claimed invention. Multiple features are described in the embodiments, but a limitation is not made to an invention that requires all such features, and multiple such features may be combined as appropriate. Furthermore, in the attached drawings, the same reference numerals are given to the same or similar configurations, and a redundant description thereof is omitted.

First Embodiment

FIG. 1 is a block diagram for implementing processing from image input to display in a conventional general image capturing apparatus.

An Analog-Digital (A/D) converter 1202 converts image data input via an image input unit 1201 from an analog signal to a digital signal.

An Opto-Electro Transfer Function (OETF) conversion unit 1203 performs OETF conversion of a digital signal.

A Digital-Analog (DA) converter 1204 converts the image data subjected to OETF conversion to an analog signal.

An Electro-Optical Transfer Function (EOTF) conversion unit 1205 performs EOTF conversion of an analog signal. A display device 1206 displays the image data subjected to OETF conversion.

The display device 1206, includes a cathode ray tube, liquid crystal, an Organic Light Emitting Diode (OLED), or the like, and each has unique light emission characteristics depending on a material and configuration. A display device such as a cathode ray tube or a liquid crystal has light emission characteristics close to the EOTF defined in ITU BT. 709. On the other hand, light emission characteristics of the OLED depend on the switching characteristics of a transistor, and the light emission characteristics of the OLED are close to the EOTF defined in SMPTE ST 2084. The EOTF conversion unit 1205 performs processing of converting the analog signal to a light emission luminance of the display device 1206 in accordance with the light emission characteristics of the display device 1206.

The OETF conversion unit 1203 performs conversion having opposite characteristics to the EOTF conversion unit 1205 that depends on the light emission characteristics of the display device 1206. Preliminarily applying the conversion by the OETF conversion unit 1203 to the image data cancels the characteristics of the EOTF conversion unit 1205. And thus, the image displayed on the display device 1206 come to have the same appearance as the image input via the image input unit 1201.

FIG. 2 is a graph of EOTF illustrating an example of SMPTE ST 2084, ITU BT. 709, and light emission characteristics of an OLED material. The vertical axis represents the ratio with respect to the maximum light emission luminance, and the horizontal axis represents, by 10-bit, the code value input to the DA converter 1204. The light emission characteristics of the OLED material are close to the EOTF of SMPTE ST 2084.

FIG. 3 is a graph of OETF illustrating an example of SMPTE ST 2084, ITU BT. 709, and light emission characteristics of an OLED material. The vertical axis represents the code value after conversion, and the horizontal axis represents the ratio with respect to the maximum light emission luminance. An OETF is an inverse function of an EOTF. The OETF of SMPTE ST 2084 is defined such that a quantization step is not visually perceptible from humans by luminance change.

FIG. 4 is a diagram in which 8-bit code values (256 gradation) are assigned to data representing the luminance of an input image as a ratio to the maximum luminance, in accordance with each OETF of SMPTE ST 2084, ITU BT. 709 and light emission characteristics of an OLED material, and compared. Many code values are assigned to low-luminance regions in SMPTE ST 2084 and the light emission characteristics of the OLED material, but fewer code values are assigned to low-luminance regions in ITU BT. 709. In such a case, it is difficult to maintain the gradation in low-luminance regions of the input image, which may cause degradation of image quality such as tone jump.

Figure 5:
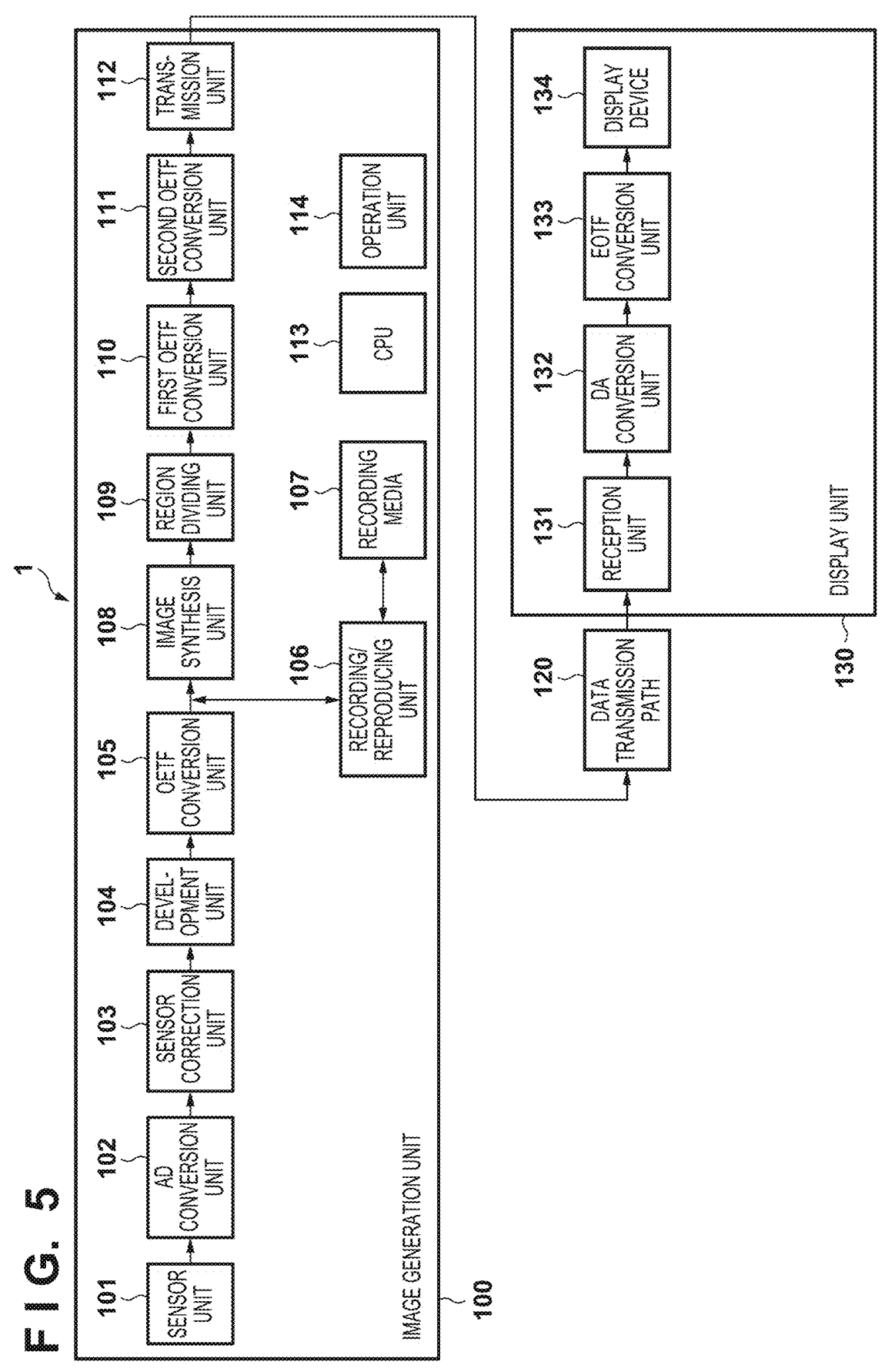
FIG. 5 is a block diagram of an image capturing apparatus according to a first embodiment.

FIG. 5 is a block diagram for explaining a configuration example of an image capturing apparatus 1, which is a first embodiment of the image processing apparatus of the present invention.

The image capturing apparatus 1 according to the first embodiment is configured by including an image generation unit 100, a data transmission path 120 configured to transmit a digital signal less than 10-bit precision, and a display unit 130.

The image generation unit 100 is configured by including a sensor unit (image capturing element) 101, an AD conversion unit 102, a sensor correction unit 103, a development unit 104, an OETF conversion unit 105, a recording/reproducing unit 106, recording media 107, an image synthesis unit 108, a region dividing unit 109, a first OETF conversion unit 110, a second OETF conversion unit 111, a transmission unit 112, a CPU 113, and an operation unit 114.

Here, the first OETF conversion unit 110 is an OETF conversion unit for High Dynamic Range (HDR) light emission characteristics, and the second OETF conversion unit 111 is an OETF conversion unit for Standard Dynamic Range (SDR) light emission characteristics.

The sensor unit 101 includes a Complementary Metal Oxide Semiconductor (CMOS) image sensor including a plurality of pixels arranged two-dimensionally. Color filters of three colors, namely, Red (R), Green (G), and Blue (B) are arranged in each pixel. The sensor unit 101 performs photoelectric conversion processing that converts light transmitted through the color filter to an analog electric signal.

The AD conversion unit 102 performs AD conversion processing that converts the analog electric signal acquired by the photoelectric conversion processing to image data including a digital signal.

The sensor correction unit 103 performs repair processing on the image data acquired by the AD conversion processing. For example, a pixel value is interpolated, by using surrounding pixel values, for a missing pixel or to a pixel determined to be unreliable because of its acquired pixel value being a maximum (minimum), in the sensor unit 101. In addition, processing of subtracting a predetermined offset value, such as dark current correction, is performed.

The development unit 104 performs, on the image data subjected to the repair processing, development processing such as conversion to a color space of luminance and color difference, noise removal, correction of optical distortion, or the like.

The OETF conversion unit 105 converts the image data developed to an OETF compliant with a generalized standard such as ITU BT. 709 or SMPTE ST 2084. Furthermore, the OETF conversion unit 105 provides the image data with information indicating to which OETF standard is converted, as OETF information.

The recording/reproducing unit 106 reproduces the image data read from the recording medium 107. The recording medium 107 is an apparatus that allows reading and writing the image data subjected to OETF conversion by the OETF conversion unit 105. An SD card (trade name), a microSD card (trade name), or the like, may be used as the recording medium 107. The recording medium 107 is detachable from the image generation unit 100, and attachable to an apparatus (such as a personal computer) other than the image generation unit 100. Here, the recording medium 107 may be a built-in recording medium that is neither attachable to nor detachable from the image generation unit 100.

The image synthesis unit 108 holds background images and GUI images as data, and synthesizes with the image data read via the recording/reproducing unit 106. In addition, when a plurality of sets of image data are read, the image synthesis unit 108 synthesizes the plurality of sets of image data into a single image. Furthermore, the image synthesis unit 108 updates the OETF information of the superimposition part in synthesizing the images.

The region dividing unit 109 divides the image data into an HDR display region and an SDR display region, based on the image data synthesized by the image synthesis unit 108 and the OETF information included in each region of the image data. When the entire image is displayed in an HDR or an SDR, dividing may be skipped.

The first OETF conversion unit 110 detects an HDR display region divided by the region dividing unit 109 and converts the detected region from the OETF of the SMPTE ST 2084 to an OETF based on the light emission characteristics of the display device 134.

The second OETF conversion unit 111 detects an SDR display region divided by the region dividing unit 109 and converts the detected region from the OETF of ITU BT. 709 to an OETF based on the light emission characteristics of the display device 134.

Here, details of the processing in the first OETF conversion unit 110 will be described, referring to FIG. 6A and FIG. 6B. Although in FIG. 6A and FIG. 6B, an example is illustrated in which pixels of the display device 134 include three colors, i.e., RGB, the same goes for a case when other colors such as cyan, magenta and yellow are used.

FIG. 6A is an explanatory diagram of processing in the first OETF conversion unit 110 in a case when the input image data of the first OETF conversion unit is RGB data.

Since the light emission characteristics of the display unit 130 is different for each of the RGB colors, light emission characteristics inverse conversion is performed for each of RGB by the first OETF conversion units 110-01, 110-02, and 110-03. A WB adjustment unit 110-04 adjusts the white balance of the RGB data subjected to the light emission characteristics inverse conversion and outputs the adjusted data. The processing order of the light emission characteristics inverse conversion and the white balance may be reversed, or may be simultaneous. Similar processing is performed with respect to the second OETF conversion unit 111.

FIG. 6B is an explanatory diagram of processing in the first OETF conversion unit 110 in a case when the input image data of the first OETF conversion unit 110 is YCC data. A YCC-RGB conversion unit 110-05 converts the input YCC data to RGB data. The processing subsequent to the RGB conversion is similar to that of FIG. 6A. An RGB-YCC conversion unit 110-06 converts the RGB data subjected to white-balance adjustment to YCC data and outputs the converted data. Similar processing is performed with respect to the second OETF conversion unit 111.

The transmission unit 112 transmits the image data subjected to conversion to the display unit 130 via the data transmission path 120.

The CPU 113 is connected to each of the aforementioned blocks and other blocks included in the image generation unit 100 via an internal bus (not illustrated). The CPU 113 controls the entire processing of the image generation unit 100. In the present embodiment, the CPU 113 also controls each block of the display unit 130.

The operation unit 114 is connected to the CPU 113 via an internal bus (not illustrated). The operation unit 114 includes various types of operation members serving as the input unit that accepts user operations. The operation unit 114 includes an image capturing start button configured to start image capture, a reproducing start button configured to reproduce an image recorded in the recording medium 107, or the like. In addition, the operation unit 114, which is displayed on the display unit 130 as a Graphical User Interface (GUI), includes function buttons for executing various functions in response to user operations. The function buttons include a start button of a DR comparison display function that displays an HDR image and an SDR image side-by-side in reproducing the images recorded in the recording medium 107, a start button of a thumbnail display function that displays a plurality of images recorded in the recording medium 107 as a list, or the like.

MIPI, Sub-LVDS, or the like, is used as the transmission standard for the data transmission path 120. The data transmission path 120 according to the present embodiment is assumed to have an 8-bit precision. A bit precision is meant to refer to a substantial bit width, instead of a physical bit width. For example, a case when a transmission path of 10-bit width is formed of valid data of 8-bit and 0-padding of 2-bit is referred as an 8-bit precision.

The display unit 130 is configured by including a reception unit 131, a DA conversion unit 132, an EOTF conversion unit 133, and the display device 134.

The reception unit 131 receives image data from the image generation unit 100 via the data transmission path 120.

The DA conversion unit 132 performs DA conversion for converting image data formed of a digital signal to an analog electric signal. The DA conversion unit 132 transmits the converted electric signal to the display device 134. Based on the intensity of the transmitted electric signal, light emission intensity of a light-emitting device in each pixel included in the display device 134 is determined.

The EOTF conversion unit 133 performs EOTF conversion based on the light emission characteristics of the display device 134. The display device 134 emits light to perform display based on the electrical signal for each pixel transmitted from the DA conversion unit 132. The EOTF conversion unit 133 performs nonlinear conversion from the electrical signal to light emission luminance, based on the electrical characteristics of the display device 134.

The display device 134 includes a plurality of pixels arranged two dimensionally. As the light-emitting device corresponding to each pixel emits light, an image is displayed. A cathode ray tube, liquid crystal, an OLED, or the like, is used as the display device of the present embodiment.

Next, processing of implementing the DR comparison display function that displays an SDR image and an HDR image stored in the recording medium 107 side-by-side on the display unit 130 will be described, referring to the flowchart of FIG. 7. In addition, image processing results of each functional block in the flow of FIG. 7 will be illustrated in FIG. 8A to FIG. 8C.

Each process in the flowchart of FIG. 7 is implemented by the CPU 113 controlling respective blocks of the image generation unit 100 and the display unit 130, and the processing is started when the CPU 113 detects that the operation unit 114 has accepted a user operation to start the DR comparison function.

At step S302, the CPU 113 controls the recording/reproducing unit 106 to read HDR image data from the recording media 107. The read image data is reproduced as image data via the recording/reproducing unit 106.

At step S303, the CPU 113 controls the image synthesis unit 108 to synthesize the read image data with background image data preliminarily held as data by the image synthesis unit 108.

At step S304, the CPU 113 determines whether or not reading and synthesis of the image data to be simultaneously displayed are completed. In a case when reading and synthesis of the image data to be simultaneously displayed are not completed (NO at S304), the processing of steps S302 to S304 are repeated. At steps S302 to S304 of the present embodiment, SDR image data to be simultaneously displayed with HDR image data is read, and an HDR/SDR synthesized image synthesized with the background image data is generated.

And, at this time, a desired GUI such as a menu or a scroll bar held as data by the image synthesis unit 108 may be synthesized. Here, a case of synthesizing icons for identifying a display format of an image will be described as an example of GUI synthesis.

The processing results of steps S302 to S304 are illustrated in FIG. 8A. A region 401 indicates background image data, a region 402 indicates HDR image data, a region 403 indicates SDR image data, a region 404 is an icon indicating that an image is displayed in HDR, and a region 405 is an icon indicating that an image is displayed in SDR. The OETF of each of the region 401, region 403, region 404 and region 405 is the OETF of ITU BT. 709, and the OETF of the region 402 is the OETF of SMPTE ST 2084.

On the other hand, in a case when reading and synthesis of image data to be simultaneously displayed are completed at step S304 (YES at S304), the HDR/SDR synthesized image that is a synthesis result is transmitted to the region dividing unit 109.

At step S305, the CPU 113 controls the region dividing unit 109 to divide the HDR/SDR synthesized image generated by the image synthesis unit 108 into an HDR display region and an SDR display region.

In the present embodiment, coordinate information and synthesis order information are provided in synthesizing each image by the image synthesis unit 108 and the OETF information of the superimposition part is updated based on these information elements. Based on the OETF information for each pixel, the region dividing unit 109 determines an HDR display region when the OETF is for HDR display.

The processing result is illustrated in FIG. 8B. A region 406 indicates an HDR display region, and a region 407 indicates an SDR display region. Therefore, in the present embodiment, an HDR image is assigned to the HDR display region, and an SDR image and a GUI image are assigned to the SDR display region. At this time, the OETF of the region 406 is determined to be SMPTE ST 2084, and the OETF of the region 407 is determined to be ITU BT. 709.

Subsequently, image data subjected to region dividing and region information indicating the determination result of whether the region is the HDR display region or the SDR display region are transmitted to the first OETF conversion unit 110.

At step S306, the CPU 113 controls the first OETF conversion unit 110 to detect the HDR display region, based on the image data and the region information transmitted from the region dividing unit 109. Subsequently, conversion from the OETF of SMPTE ST 2084 to an OETF based on the light emission characteristics of the display device 134 is performed for the HDR display region. The converted data is then transmitted to the second OETF conversion unit 111.

At step S307, the CPU 113 controls the second OETF conversion unit 111 to detect the SDR display region, based on the image data and the region information transmitted from the first OETF conversion unit 110. Subsequently, conversion from the OETF of ITU BT. 709 to an OETF based on the light emission characteristics of the display device 134 is performed for the SDR display region.

The processing result of steps S306 and S307 is illustrated in FIG. 8C. The OETF of each of the region 406 and region 407 after conversion is an OETF based on the light emission characteristics of the display device 134.

At step S308, the CPU 113 controls the second OETF conversion unit 111 to transmit the converted image data to the display unit 130 via the transmission unit 112 and the data transmission path 120.

At step S309, the CPU 113 controls the reception unit 131 to receive the image data transmitted via the data transmission path 120.

At step S310, the CPU 113 controls the DA conversion unit 132 to convert the image data formed of a digital signal to an analog signal.

At step S311, the CPU 113 controls the EOTF conversion unit 133 to apply the EOTF conversion to the image data based on the light emission characteristics of the display device 134, and determines the light emission luminance of each pixel in the display device 134.

At step S312, the CPU 113 causes the display device to emit light to display the image on the display unit 130.

Although the foregoing description has been provided in an assumption that the HDR EOTF is based on SMPTE ST 2084, the HDR EOTF is not limited to SMPTE ST 2084. In a case when assignment to gradation of dark regions is larger than SDR, the EOTF may be an HDR EOTF.

In the foregoing description, processing has been explained as an example that implements an image display state in which the SDR image and the HDR image are displayed side-by-side on the display unit 130, as illustrated in FIG. 8A. However, a thumbnail display in which an HDR image and an SDR image are mixed, as illustrated in FIG. 9, can also be implemented by similar processing.

In addition, a single or a plurality of sets of image data may be read from the recording medium 107, and the HDR image and the SDR image may or may not be mixed.

According to the present embodiment as has been described above, by dividing the HDR/SDR synthesized image data into an HDR display region and an SDR display region and converting each region to an OETF based on the light emission characteristics of the display device, the HDR image and the SDR image can be transmitted via a single port and display the images in a mixed manner.

Second Embodiment

Figure 10:
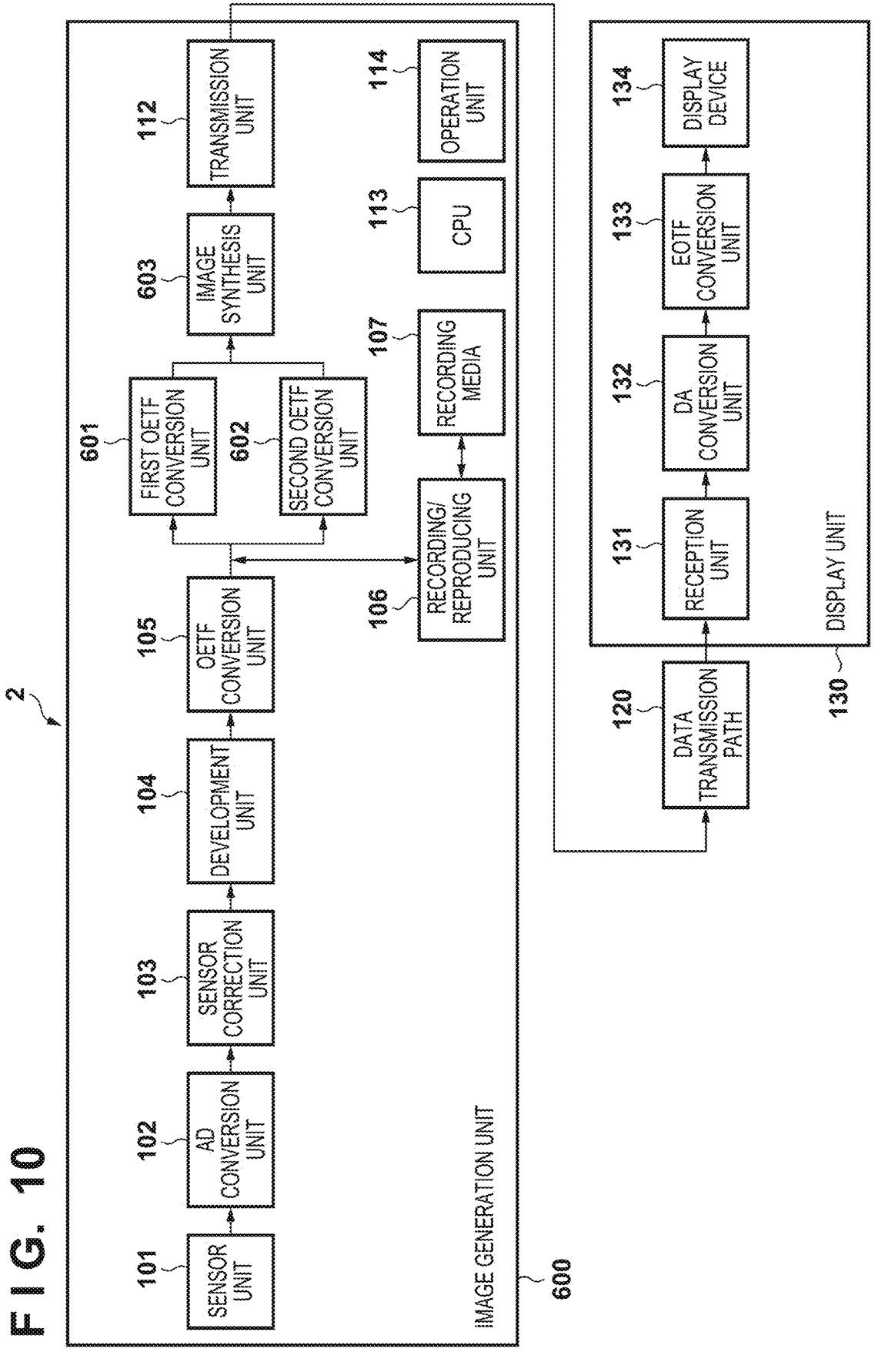
FIG. 10 is a block diagram of an image capturing apparatus according to a second embodiment.

FIG. 10 is a block diagram for explaining a configuration example of an image capturing apparatus 2, which is a second embodiment of the image processing apparatus of the present invention. Similar components to those of the first embodiment are provided with the same reference signs, and the description thereof will be omitted.

The image capturing apparatus 2 according to the second embodiment is configured by including an image generation unit 600, the data transmission path 120 configured to transmit a digital signal of less than 10-bit precision, and the display unit 130.

The second embodiment is configured such that the image generation unit 600 does not include the region dividing unit 109, and connection order of the first OETF conversion unit 110, the second OETF conversion unit 111, and the image synthesis unit 108 of the first embodiment is changed.

In the second embodiment, the read image data is converted to an OETF based on the light emission characteristics of the display device 134 by using the first OETF conversion unit 601 and the second OETF conversion unit 602. Subsequently, the image synthesis unit 603 synthesizes the background image, the HDR image, and the SDR image.

Similarly to the first embodiment, processing of implementing the DR comparison display function that displays the SDR image and the HDR image stored in the recording medium 107 side-by-side on the display unit 130 will be described, referring to the flowchart of FIG. 11. In addition, image processing results in the flowchart of FIG. 11 will be illustrated in FIG. 12A and FIG. 12B.

Each process in the flowchart of FIG. 11 is implemented by the CPU 113 controlling respective blocks of the image generation unit 600 and the display unit 130, and the processing is started when the CPU 113 detects that the operation unit 114 has accepted a user operation to start the DR comparison function.

At step S702, the CPU 113 controls the recording/reproducing unit 106 to read the HDR image data from the recording media 107. The read image data is reproduced as image data via the recording/reproducing unit 106.

At step S703, the CPU 113 determines whether or not the OETF of the read image data is HDR. When the OETF of the read image data is HDR (YES at S703), the CPU 113 proceeds to step S704 and sends the image data to the first OETF conversion unit 601.

At step S704, the CPU 113 controls the first OETF conversion unit 601 to convert the image data from the OETF of the SMPTE ST 2084 to an OETF based on the light emission characteristics of the display device 134. Subsequently, the image data subjected to OETF conversion is sent to the image synthesis unit 603.

At step S706, the CPU 113 controls the image synthesis unit 603 to synthesize the HDR image data subjected to OETF conversion by the first OETF conversion unit 601 with the background image data preliminarily held as data by the image synthesis unit 603. It is assumed that the OETF of the background image data is preliminarily converted to an OETF based on the light emission characteristics of the display device 134.

Figure 12A:
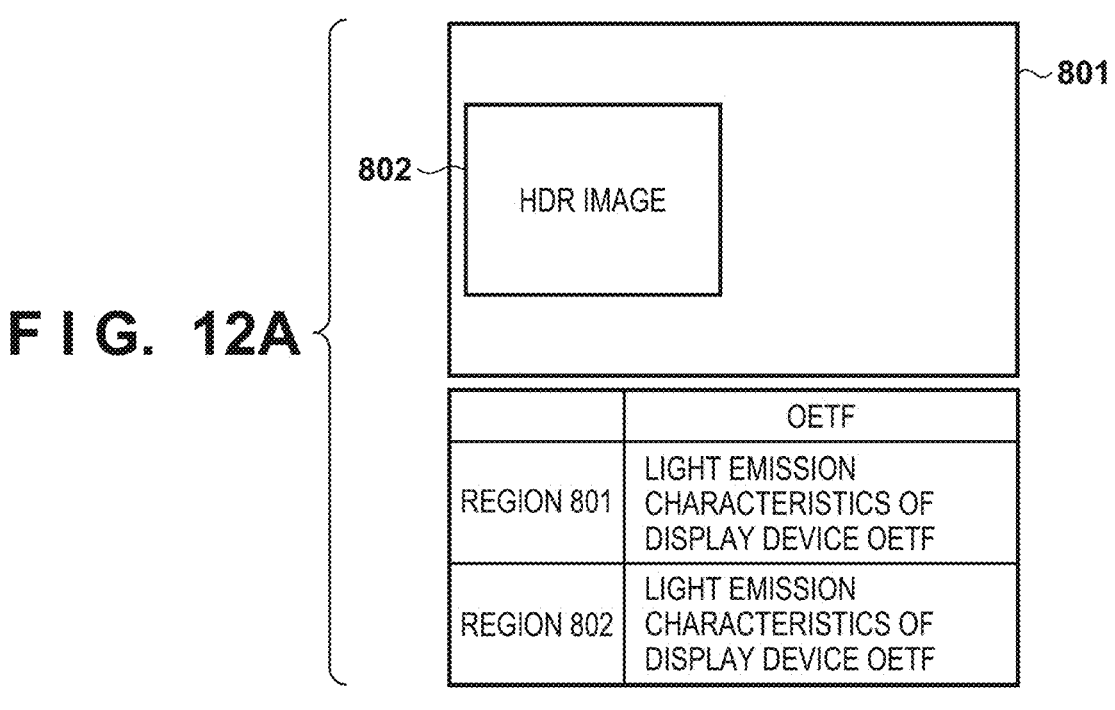
FIG. 12A and FIG. 12B are diagrams illustrating image processing results according to the second embodiment.

The processing result is illustrated in FIG. 12A. A region 801 indicates background image data, and a region 802 indicates an HDR image after conversion to the light emission characteristics OETF of the display device 134.

At step S707, the CPU 113 determines whether or not reading and synthesis of the image data to be simultaneously displayed are completed. In a case when reading and synthesis of the image data to be simultaneously displayed are not completed (NO at S707), the processing of steps S702 to S706 are repeated. At steps S702 to S706 of the present embodiment, the SDR image data to be simultaneously displayed with the HDR image data is read, and the SDR image data is converted to an OETF based on the light emission characteristics of the display device 134, and then the converted data is synthesized with the background image data.

At step S702, the CPU 113 controls the recording/reproducing unit 106 to read the SDR image data from the recording media 107. The read image data is reproduced as image data via the recording/reproducing unit 106.

At step S703, the CPU 113 determines whether or not the OETF of the read image data is HDR. When it is determined that the OETF of the read image data is the SDR (NO at S703), the processing proceeds to step S705 and the image data is sent to the second OETF conversion unit 602.

At step S705, the CPU 113 controls the second OETF conversion unit 602 to convert the image data from the OETF of ITU BT. 709 to an OETF based on the light emission characteristics of the display device 134. Subsequently, the image data subjected to OETF conversion is sent to the image synthesis unit 603.

At step S706, the CPU 113 controls the image synthesis unit 603 to synthesize the SDR image data subjected to the OETF conversion by the second OETF conversion unit 602 with the background image data to generate an HDR/SDR synthesized image.

Figure 12B:
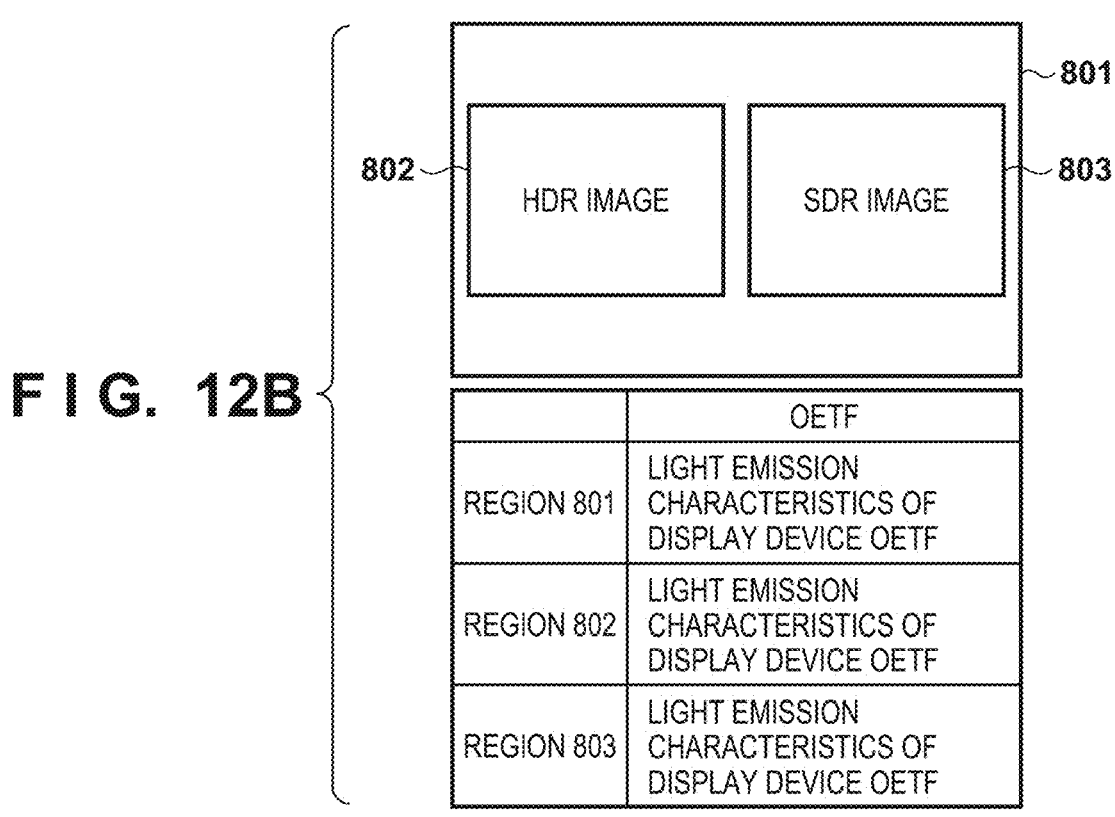

The processing result is illustrated in FIG. 12B. A region 803 indicates an SDR image converted to an OETF based on the light emission characteristics of the display device 134.

At this time, a desired GUI such as a menu or a scroll bar held as data by the image synthesis unit 603 may be synthesized. Here, it is assumed that the OETF of the GUI image is preliminarily converted to an OETF based on the light emission characteristics of the display device 134.

At step S707, the CPU 113 determines whether or not reading and synthesis of the image data to be simultaneously displayed are completed. In a case when reading and synthesis of all the pieces of image data to be displayed on the display unit 130 are completed (YES at S707), the processing proceeds to step S708 and the image data is sent to the display unit 130 via the transmission unit 112 and the data transmission path 120. In a case when reading and synthesis of all the pieces of the image data are not completed (NO at S707), steps S702 to S708 are repeated.

At step S709, the CPU 113 controls the reception unit 131 to receive the image data transmitted via the data transmission path 120.

At step S710, the CPU 113 controls the DA conversion unit 132 to convert the image data formed of a digital signal to an analog signal.

At step S711, the CPU 113 controls the EOTF conversion unit 133 to apply the EOTF conversion based on the light emission characteristics of the display device 134 to the image data, and determines the light emission luminance of each pixel in the display device 134.

At step S712, the CPU 113 causes the display device to emit light to display the image on the display unit 130.

As has been described above, a different configuration from that of the first embodiment allows for transmitting an HDR image and an SDR image via a single port and displaying the images in a mixed manner.

Third Embodiment

Figure 13:
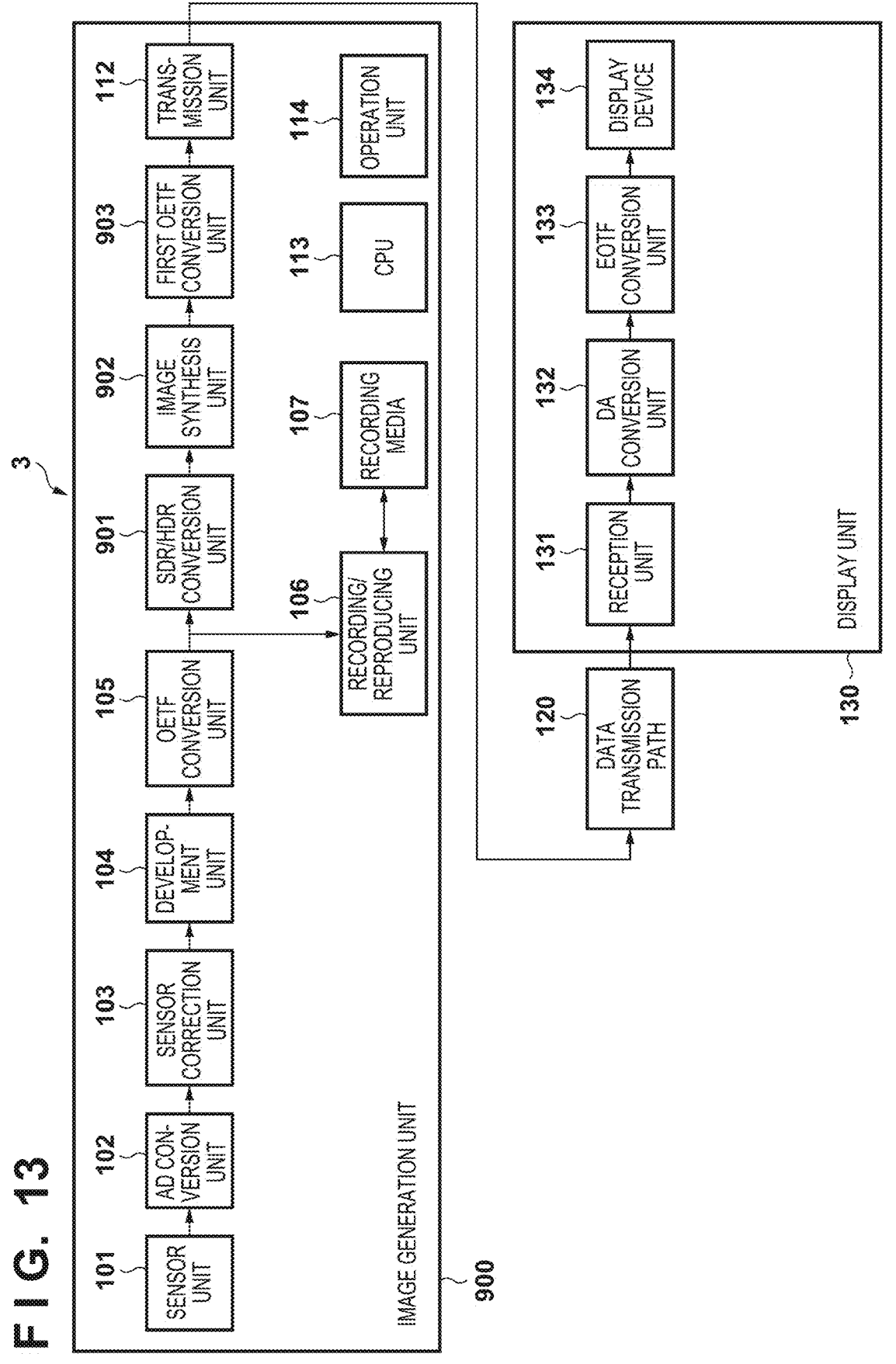
FIG. 13 is a block diagram of an image capturing apparatus according to a third embodiment.

FIG. 13 is a block diagram illustrating a configuration example of an image capturing apparatus 3, which is a third embodiment of the image processing apparatus of the present invention. Similar components to those of the first embodiment are provided with the same reference signs, and the description thereof will be omitted.

The image capturing apparatus 3 according to the third embodiment is configured by including an image generation unit 900, the data transmission path 120 configured to transmit a digital signal of less than 10-bit precision, and the display unit 130.

In the third embodiment, the image generation unit 600 does not include the second OETF conversion unit 111, and includes an SDR/HDR conversion unit 901 as addition to the first embodiment. In addition, the connection order of the first OETF conversion unit 110 and the image synthesis unit 108 is changed.

The SDR/HDR conversion unit 901 changes the OETF of the SDR image from the OETF of ITU BT. 709 to the OETF of SMPTE ST 2084.

In the third embodiment, the OETF of the SDR image is once converted to an HDR OETF by the SDR/HDR conversion unit 901 in displaying the HDR image and the SDR image in a mixed manner on the display unit 130. Subsequently, the image synthesis unit 902 synthesizes the HDR image, the SDR image converted to the HDR OETF, and the background image. The first OETF conversion unit 903 then converts the synthesized image data to an OETF based on the light emission characteristics of the display device 134.

Processing of implementing the DR comparison display function that displays the SDR image and the HDR image stored in the recording medium 107 side-by-side on the display unit 130 in a case when the light emission characteristics of the display device 134 is close to the EOTF of HDR will be described, referring to the flowchart of FIG. 14. In addition, image processing results in the flowchart of FIG. 14 will be illustrated in FIG. 15A to FIG. 15C.

Each process in the flowchart of FIG. 14 is implemented by the CPU 113 controlling respective blocks of the image generation unit 900 and the display unit 130, and the processing is started when the CPU 113 detects that the operation unit 114 has accepted a user operation to start the DR comparison function.

Here, the expression "the light emission characteristics of the display device 134 is close to the EOTF of HDR" means that the sum of squared differences between the light emission characteristics of the display device 134 and the EOTF of HDR is less than the sum of squared difference between the light emission characteristics of the display device 134 and the EOTF of SDR.

At step S1002, the CPU 113 controls the recording/reproducing unit 106 to read the HDR image data from the recording media 107. The read image data is reproduced as image data via the recording/reproducing unit 106.

At step S1003, it is determined whether or not the OETF of the read image data is HDR. When it is determined that the OETF of the read image data is HDR (YES at S1003), the processing proceeds to step S1005 and sends the image data to the image synthesis unit 902.

At step S1005, the CPU 113 controls the image synthesis unit 902 to synthesize the transmitted image data with the background image data preliminarily held as data by the image synthesis unit 902. It is assumed that the OETF of the background image data is preliminarily converted to the OETF of SMPTE ST 2084.

The processing result is illustrated in FIG. 15A. A region 1101 indicates the background image data, and a region 1102 indicates the HDR image data read from the recording medium.

At step S1006, the CPU 113 determines whether or not reading and synthesis of the image data to be simultaneously displayed are completed. In a case when reading and synthesis of the image data to be simultaneously displayed are not completed (NO at S1006), the processing of steps S1002 to S1006 are repeated. At steps S1002 to S1006 of the present embodiment, the SDR image data to be simultaneously displayed with the HDR image data is read, and the SDR image data is synthesized with the background image.

At step S1002, the CPU 113 controls the recording/reproducing unit 106 to read the SDR image data from the recording media 107. The read image data is reproduced as image data via the recording/reproducing unit 106.

At step S1003, when it is determined that the OETF of the read image data is SDR (NO at S1003), the recording/reproducing unit 106 sends the image data to the SDR/HDR conversion unit.

At step S1004, the CPU 113 controls the SDR/HDR conversion unit 901 to convert the read SDR image data from the OETF of ITU BT. 709 to the OETF of SMPTE ST 2084. The SDR/HDR conversion unit 901 transmits the converted image data to the image synthesis unit 902.

At step S1005, the CPU 113 controls the image synthesis unit 902 to synthesize the converted SDR image data with the background image data to generate an HDR/SDR synthesized image. The processing result is illustrated in FIG. 15B. A region 1103 indicates the converted SDR image.

At this time, a desired GUI such as a menu or a scroll bar held as data by the image synthesis unit 902 may be synthesized. It is assumed that the OETF of the GUI image is preliminarily converted to the OETF of SMPTE ST 2084.

At step S1006, the CPU 113 determines whether or not reading and synthesis of the image data to be simultaneously displayed are completed. In a case when reading and synthesis of all the pieces of image data to be displayed on the display unit 130 are completed (YES at S1006), the image data is sent to the first OETF conversion unit 903.

At step S1007, the CPU 113 controls the first OETF conversion unit 903 to convert the OETF of the transmitted image data from the SMPTE ST 2084 to an OETF based on the light emission characteristics of the display device 134. The processing result is illustrated in the FIG. 15C.

At step S1008, the CPU 113 transmits the converted image data to the display unit 130 via the transmission unit 112 and the data transmission path 120.

At step S1009, the CPU 113 controls the reception unit 131 to receive the image data transmitted via the data transmission path 120.

At step S1010, the CPU 113 controls the DA conversion unit 132 to convert the image data formed of a digital signal to an analog signal.

At step S1011, the CPU 113 controls the EOTF conversion unit 133 to apply the EOTF conversion based on the light emission characteristics of the display device 134 to the image data, and determines the light emission luminance of each pixel in the display device 134.

At step S1012, the CPU 113 causes the display device to emit light to display the image on the display unit 130.

As has been described above, a different configuration from those of the first and the second embodiments allows for transmitting an HDR image and an SDR image via a single port and displaying the images in a mixed manner.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
   at least one processor or circuit configured to function as:
   a first conversion unit configured to perform at least one of a first conversion that includes converting an Opto-Electro Transfer Function (OETF) of a High Dynamic Range image (HDR image) to an OETF based on light emission characteristics of a display device, or a second conversion that includes converting an OETF of a Standard Dynamic Range image (SDR image) to the OETF of light emission characteristics of the display device;
   a transmission unit configured to transmit the HDR image converted by the first conversion and the SDR image converted by the second conversion to the display device; and
   a synthesis unit configured to synthesize the HDR image and the SDR image before performing the conversion by the first conversion and the second conversion.

2. The image processing apparatus according to claim 1, wherein inverse conversion of light emission characteristics of the display device is performed in the first conversion and the second conversion.

3. The image processing apparatus according to claim 1, wherein the at least one processor or circuit is further configured to function as a display device configured to simultaneously display the HDR image converted by the first conversion and the SDR image converted by the second conversion.

4. The image processing apparatus according to claim 1, wherein the at least one processor or circuit is further configured to function as a dividing unit configured to divide a synthesized image, which is synthesized by the synthesis unit, into an HDR display region and an SDR display region.

5. The image processing apparatus according to claim 4, wherein the first conversion includes converting the HDR display region to the OETF based on light emission characteristics of the display device.

6. The image processing apparatus according to claim 4, wherein the second conversion incudes converting the SDR display region to the OETF based on light emission characteristics of the display device.

7. The image processing apparatus according to claim 1, wherein the at least one processor or circuit is further configured to function as a second conversion unit configured to convert the SDR image to an OETF of an HDR.

8. The image processing apparatus according to claim 7, wherein the synthesis unit synthesizes the SDR image converted by the second conversion unit and the HDR image.

9. The image processing apparatus according to claim 1, wherein the display device includes an Organic Light Emitting Diode (OLED), an Electro-Optical Transfer Function (EOTF) of an HDR is based on SMPTE STANDARD 2084, and an EOTF of an SDR is based on RECOMMENDATION ITU-R BT. 709.

10. The image processing apparatus according to claim 1, wherein the transmission unit includes a single port, and a standard of a signal to be transmitted is compliant with MIPI or Sub-LVDS.

11. An image capturing apparatus comprising:
    an image capturing device; and
    an image processing apparatus including at least one processor or circuit configured to function as:
    a first conversion unit configured to perform at least one of a first conversion that includes converting an Opto-Electro Transfer Function (OETF) of a High Dynamic Range image (HDR image) to an OETF based on light emission characteristics of a display device, or a second conversion that includes converting an OETF of a Standard Dynamic Range image (SDR image) to the OETF of light emission characteristics of the display device;

a transmission unit configured to transmit the HDR image converted by the first conversion and the SDR image converted by the second conversion to the display device; and a synthesis unit configured to synthesize the HDR image and the SDR image before performing the conversion by the first conversion and the second conversion.

12. A method of controlling an image processing apparatus, the method comprising:

performing a first conversion that includes performing at least one of a first conversion that includes converting an Opto-Electro Transfer Function (OETF) of a High Dynamic Range image (HDR image) to an OETF based on light emission characteristics of a display device, or a second conversion that includes converting an OETF of a Standard Dynamic Range image (SDR image) image to the OETF of light emission characteristics of the display device;

transmitting the HDR image converted by the first conversion and the SDR image converted by the second conversion to the display device; and synthesizing the HDR image and the SDR image before performing the first conversion and the second conversion.

13. A non-transitory computer-readable storage medium storing a program for causing a computer to execute each step of a method of controlling an image processing apparatus, the method comprising:

performing a first conversion that includes performing at least one of a first conversion that includes converting an Opto-Electro Transfer Function (OETF) of a High Dynamic Range image (HDR image) to an OETF based on light emission characteristics of a display device, or a second conversion that includes converting an OETF of a Standard Dynamic Range image (SDR image) to the OETF of light emission characteristics of the display device;

transmitting the HDR image converted by the first conversion and the SDR image converted by the second conversion to the display device; and synthesizing the HDR image and the SDR image before performing the first conversion and the second conversion.

* * * * *